United States Patent

Koenig et al.

[11] Patent Number: 6,065,810
[45] Date of Patent: May 23, 2000

[54] COVER ASSEMBLY FOR A TELESCOPING TOWER OF A VEHICULAR SEAT

[75] Inventors: Kirk P. Koenig, Waterford; Ricardo O. Quincoses, Jr., Grand Blanc, both of Mich.

[73] Assignee: Lear Corporation, Southfield, Mich.

[21] Appl. No.: 09/212,466

[22] Filed: Dec. 16, 1998

Related U.S. Application Data

[62] Division of application No. 08/808,892, Feb. 28, 1997.
[60] Provisional application No. 60/025,313, Sep. 24, 1996.

[51] Int. Cl.⁷ ..................................................... B60R 22/26
[52] U.S. Cl. ......................... 297/482; 297/410; 297/473; 297/216.12
[58] Field of Search ................... 297/410, 482, 297/483, 473, 463.1, 216.12

[56] References Cited

U.S. PATENT DOCUMENTS

| | | | |
|---|---|---|---|
| 3,318,634 | 5/1967 | Nicholas | 297/482 X |
| 3,471,197 | 10/1969 | Ely | 297/483 X |
| 4,177,807 | 12/1979 | Ocel et al. | 297/482 X |
| 4,527,835 | 7/1985 | Barnett | 297/482 |
| 4,749,231 | 6/1988 | Cremer et al. | 297/483 X |
| 5,364,170 | 11/1994 | West | 297/483 |
| 5,390,982 | 2/1995 | Johnson et al. | 297/483 X |
| 5,556,171 | 9/1996 | Busch | 297/483 |
| 5,599,070 | 2/1997 | Pham et al. | 297/483 |
| 5,658,048 | 8/1997 | Nemoto | 297/473 X |
| 5,848,661 | 12/1998 | Fu | 297/410 X |
| 5,918,943 | 7/1999 | Mitschelen et al. | 297/463.1 X |

*Primary Examiner*—Peter M. Cuomo
*Assistant Examiner*—David E Allred
*Attorney, Agent, or Firm*—MacMillan, Sobanski & Todd, LLC; A. Michael Tucker

[57] ABSTRACT

A vehicular seat assembly includes a seat bottom defining an occupant sitting area and a seat back defining an occupant back support and coupled to the seat bottom. A shoulder belt restraint is operatively connected to the seat back for restraining an occupant in the seat assembly. A telescoping tower is mounted to the seat back for selectively adjusting the shoulder belt restraint between a lower position immediately adjacent the seat back and a raised position spaced vertically from the seat back. A tower cover is fixedly secured to at least a portion of the tower and vertically movable therewith. The tower cover includes an expandable window portion coupled between the tower and the seat back for automatically expanding coverage of the tower upon movement of the tower between the lower position and the raised position.

16 Claims, 6 Drawing Sheets

6,065,810

COVER ASSEMBLY FOR A TELESCOPING TOWER OF A VEHICULAR SEAT

CROSS REFERENCE TO RELATED APPLICATIONS

This is a division of U.S. patent application identified as Ser. No. 08/808,892 filed Feb. 28, 1997, which claims the benefit of U.S. provisional patent application identified as Application Ser. No. 60/025,313, filed Sep. 24, 1996.

BACKGROUND OF THE INVENTION

This invention relates generally to vehicular seat assemblies, and in particular is concerned with a cover assembly for a telescoping tower of a vehicular seat.

Seat assemblies for vehicles include a seat back coupled or otherwise connected to a seat bottom. Restraints are provided on a seat assembly to secure a passenger to the seat. Such restraints can include a shoulder belt and a waist belt. The shoulder belt and the waist belt are usually secured to retractors to permit adjustments to the belts for the comfort and safety of a passenger.

A telescoping tower can be mounted on a side surface of a seat back. Such a tower can provide a housing for a shoulder belt. A retractor for the shoulder belt can be mounted in the tower. If desired, a headrest can be mounted to the tower. The tower is vertically adjusted to position the shoulder belt and/or the headrest to accommodate a passenger. In a first or lower position, the tower is positioned so that the shoulder belt and/or headrest are adjacent a top surface of the seat back. In a second or upper position, the tower is positioned so that the shoulder belt and/or headrest vertically spaced from a top surface of the seat back.

As the tower is extended above a top surface of the seat back, an opening or gap formed in a tower cover can expose the tower. It is desirable to cover this opening at all positions of the tower.

SUMMARY OF THE INVENTON

This subject invention includes a cover assembly for a telescoping tower of a vehicular seat assembly. The cover assembly includes a window portion that expands as necessary to cover a gap formed in the cover when the tower is extended above a seat back. The window portion contracts when the tower is lowered to the seat back.

In a preferred embodiment, a vehicular seat assembly includes a seat bottom defining an occupant sitting area and a seat back defining an occupant back support and coupled to the seat bottom. A shoulder belt restraint is operatively connected to the seat back for restraining an occupant in the seat assembly. A telescoping tower is mounted to the seat back for selectively adjusting the shoulder belt restraint between a lower position immediately adjacent the seat back and a raised position spaced vertically from the seat back. A tower cover is fixedly secured to at least a portion of the tower and vertically movable therewith. The tower cover includes an expandable window portion coupled between the tower and the seat back for automatically expanding coverage of the tower upon movement of the tower between the lower position and the raised position.

The expandable window portion of the tower cover can be formed from a plurality of overlapping panes slidably mounted in a rim. Alternately, the window portion can be formed from a flexible sheet that expands and contracts in accordion-like fashion between the lower and raised positions of the tower.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
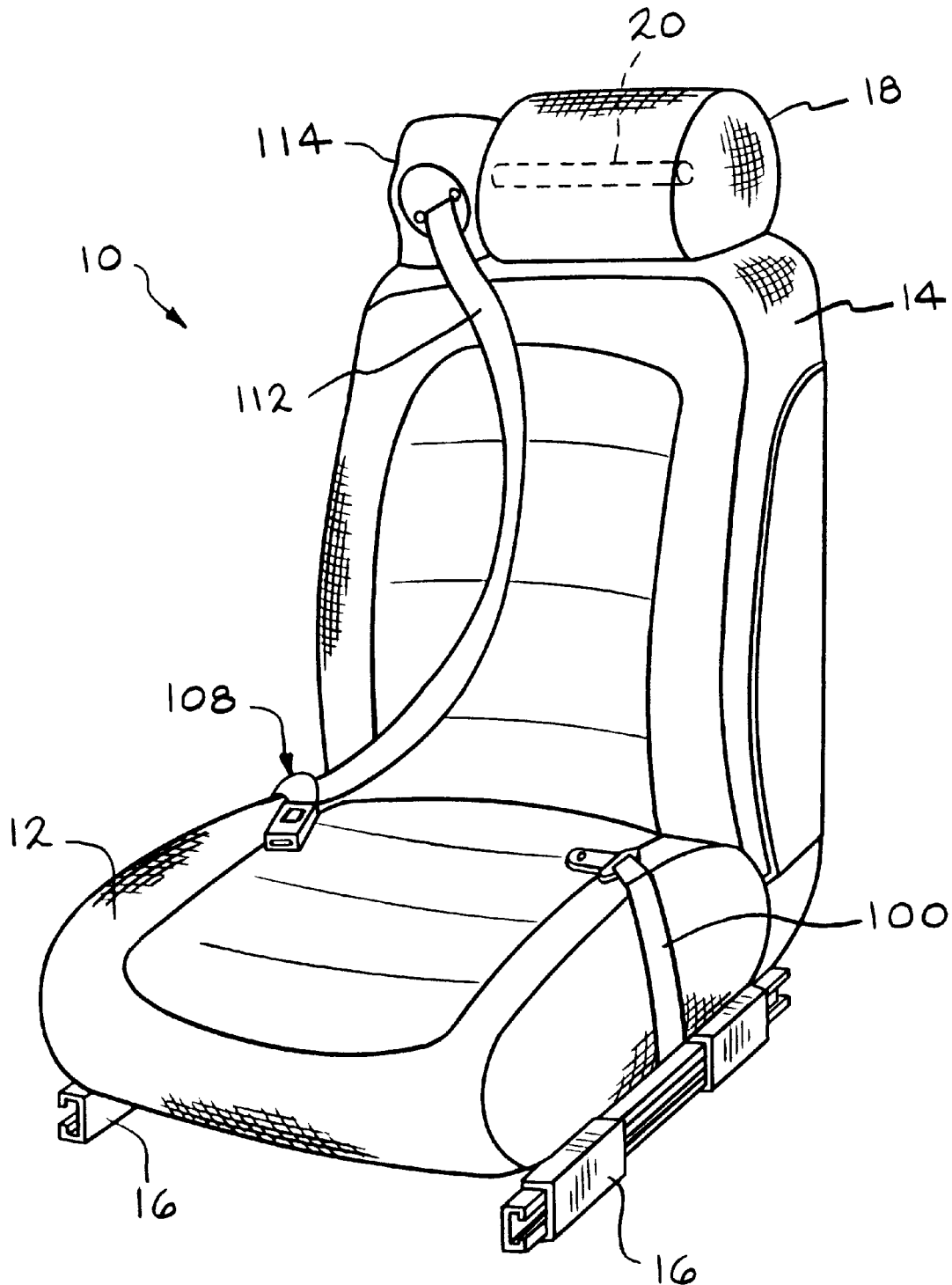
FIG. 1 is a perspective view of a vehicular seat assembly with a headrest assembly in a position.
Figure 2:
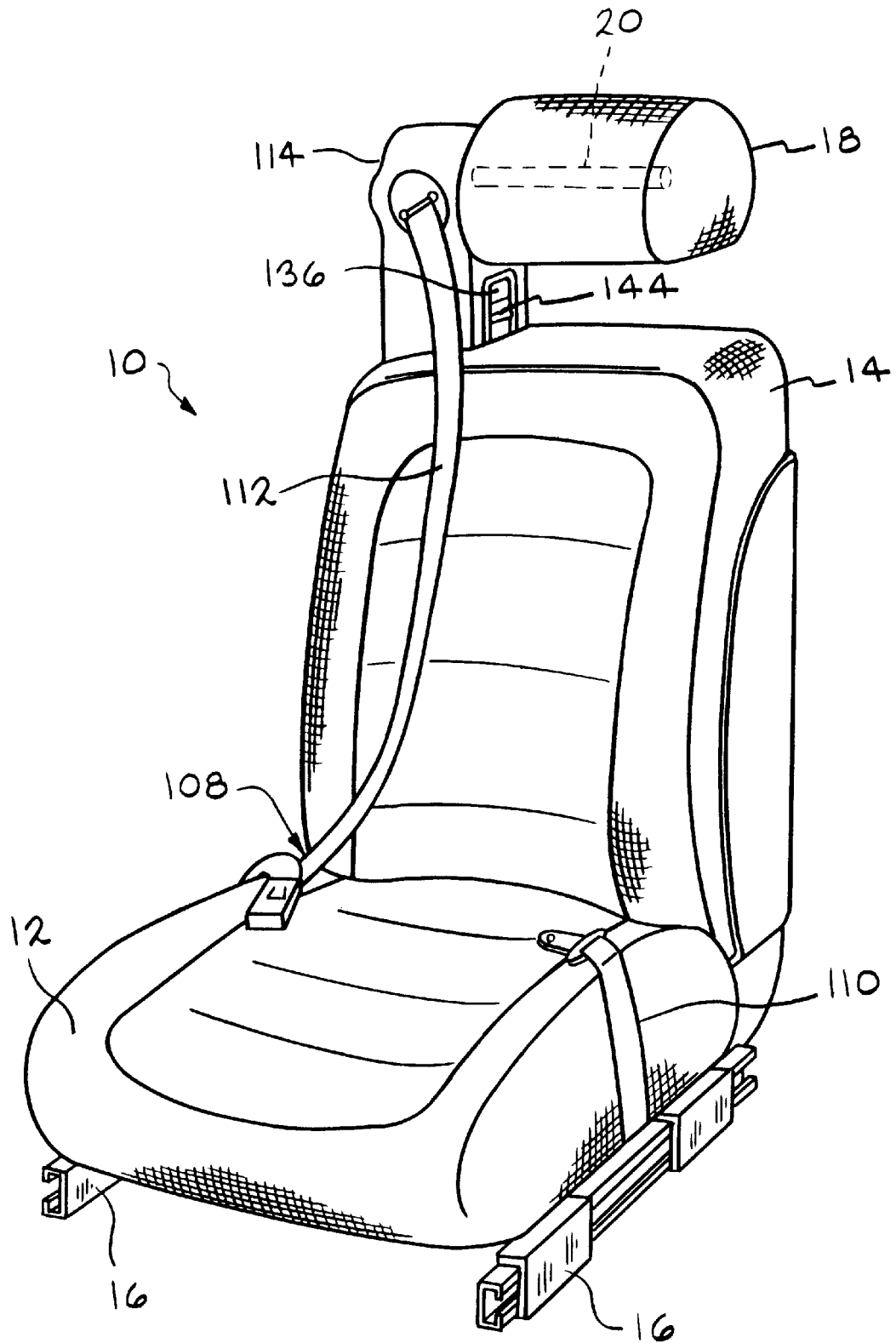
FIG. 2 is a perspective view of the vehicular seat assembly of FIG. 1 with the headrest assembly in a raised position.

Referring to the Figures, wherein like numerals reference like or corresponding parts throughout the several views, a vehicular seat assembly is indicated generally at 10 in FIGS. 1 and 2. The seat assembly 10 comprises a generally horizontal seat bottom 12 upon which an occupant sits, and generally upright seat back 14 coupled to the seat bottom 12. The seat assembly 10 is commonly supported by a pair of fore and aft adjustable seat tracks 16 that are then mounted to a vehicle floor (not shown). The seat bottom 12 and seat back 14 are commonly constructed of a contoured polyurethane foam pad encapsulated in a trim cover of cloth fabric, vinyl or leather.

An adjustable headrest assembly is indicated generally at 18 and includes a mounting post 20 for mounting or attaching the headrest assembly 18 to the seat assembly 10. The headrest assembly 18 is vertically adjustable between a lower position, as shown in FIG. 1, with the headrest assembly 18 immediately adjacent the top of the seat back 14 and a raised position, as shown in FIG. 2, with the headrest assembly 18 spaced vertically above the seat back 14. The headrest assembly 18 is also pivotally adjustable in both the forward and rearward directions as will be described in greater detail below.

Figure 3:
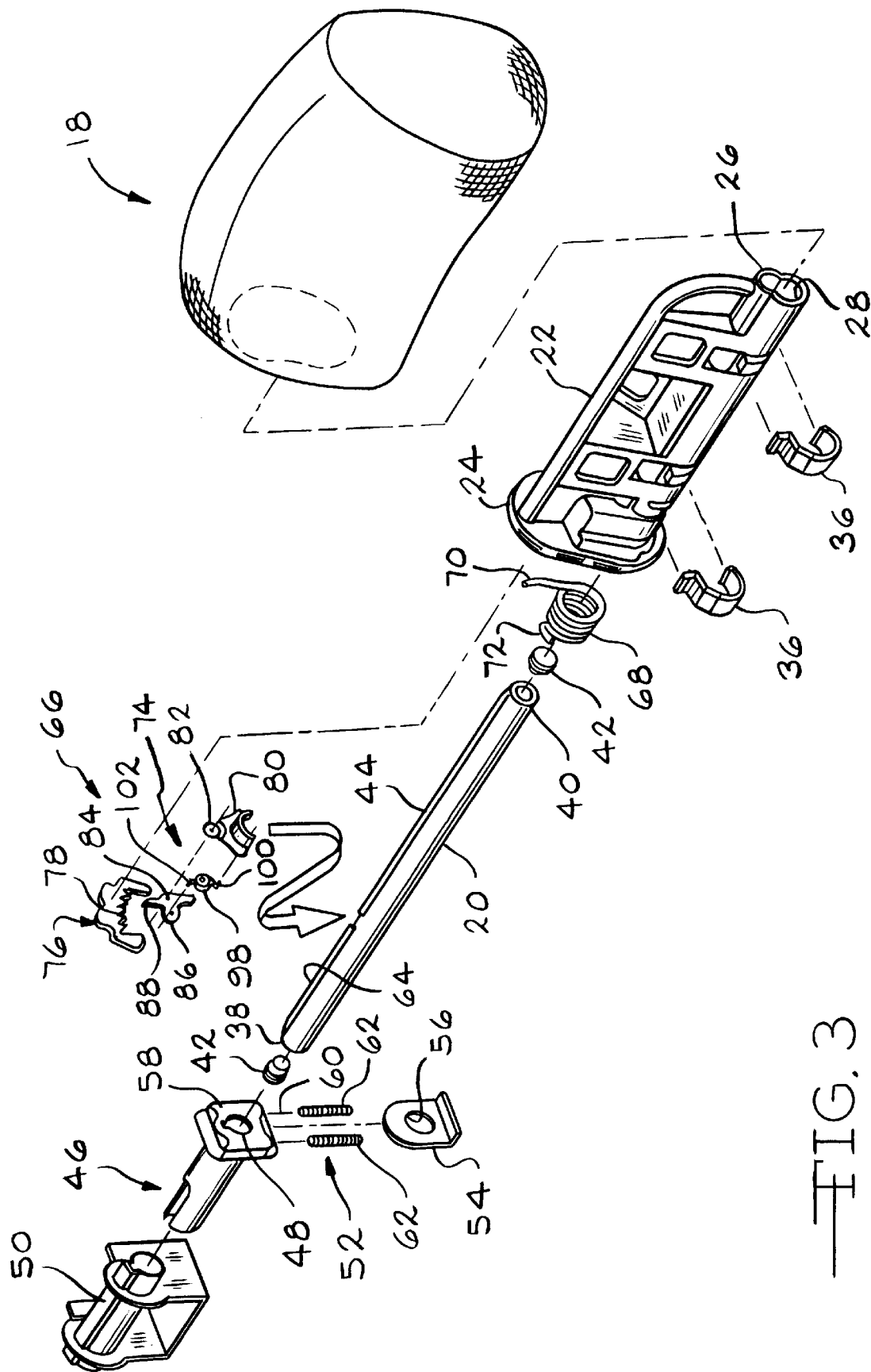
FIG. 3 is an exploded perspective view of the headrest assembly cantilevered and detached from the seat assembly of FIGS. 1 and 2.

As shown in FIG. 3, the headrest assembly 18 further includes an elongated headrest body 22 extending horizontally between opposing first 24 and second 26 side ends and fabricated of a rigid organic polymeric material defining a tubular opening 28 between the side ends 24, 26 within the headrest body 22. The mounting post 20 is received through the tubular opening 28 between the first 24 and second 26 side ends. The first side end 24 includes a generally oval shaped cavity 30 formed integrally with the headrest body 22 including an upper portion 32 and a lower portion 34. The tubular opening 28 for receiving the mounting post 20 extends through the lower portion 34 of the cavity 30 to the second side end 26.

A pair of retaining clips 36 extend around and through a portion of the headrest body 22 into the tubular opening 28 to engage and retain the mounting post 20 in the opening 28 between the first 24 and second 26 ends of the headrest body 22. The mounting post 20 has a distal end 38 extending outwardly from the tubular opening 28 in the first end 24 of the headrest body 22 and a proximal end 40 extending to the second side end 26 of the headrest body 22. Each of the distal 38 and proximal 40 ends of the mounting post is closed by end caps 42. The mounting post 22 is constructed from a single piece of cylindrical metal tube having a generally circular cross section and a raised ridge 44 extending between the distal 38 and proximal 40 ends. An elongated headrest guide sleeve 46, as shown in FIG. 3, has a tubular opening 48 for receiving the distal end 38 of the mounting post 22 to detachably connect the headrest assembly 18 to a portion of the seat assembly 10. The guide sleeve 46 is received and fixedly secured within a tubular support structure 50 which forms an upper portion of an adjustable tower which will be described in greater detail herein below. The guide sleeve 46 includes a locking mechanism 52 which comprises a spring bias detente 54 operatively connected to the sleeve 46 and having an opening 56 for receiving the distal end 38 of the mounting post 20 therethrough. The spring bias detente 54 forms a generally rectangular shaped tab member which is received into a generally rectangular housing 58 having a slot 60 therein for slidably receiving the detente 54 and symmetrically aligning the opening 56 with the tubular opening 48 in the guide sleeve 46. A pair of springs 62 urge the detente 54 out of the housing 58 and into engagement with a notch 64 in the raised ridge 44 of the mounting post 20.

More specifically, with the spring bias detente 54 depressed against the biasing force of the springs 62 such that the opening 56 aligns with the tubular opening 48 in the guide sleeve 46, the distal end 38 may be received through the opening 56 in the detente 54 and into the guide sleeve 46. Once the detente 54 is released, the biasing force of the springs 62 urge the edge of opening 56 against the raised ridge 44 of the mounting post 20 until the detente 54 is received and locked into the notch 64 which prevents the mounting post 20 from being removed from the guide sleeve 46.

Figure 4:
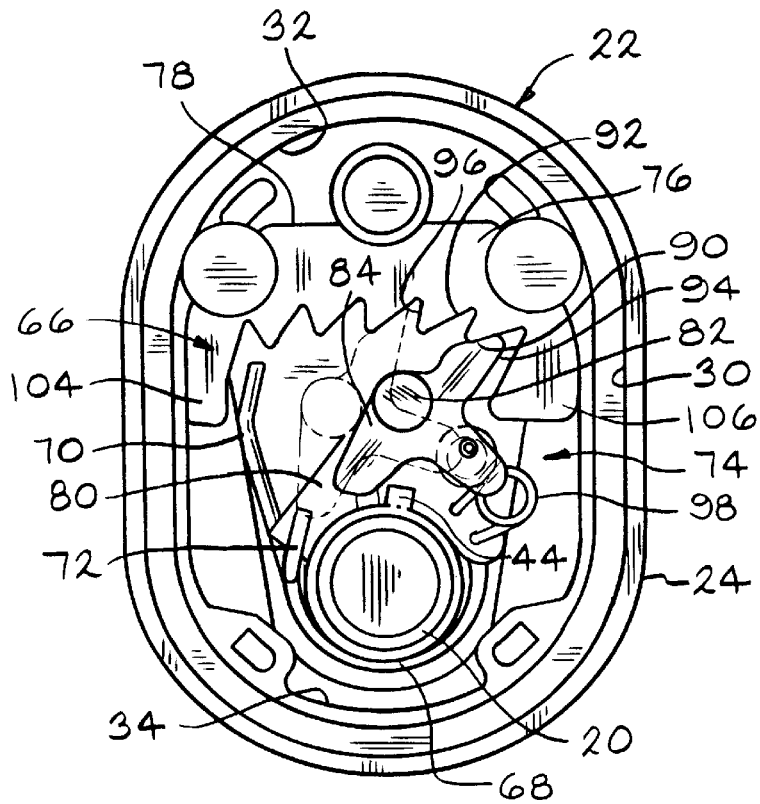
FIG. 4 is an end view of a first end of a headrest body and ratchet mechanism shown in a rearward position.
Figure 5:
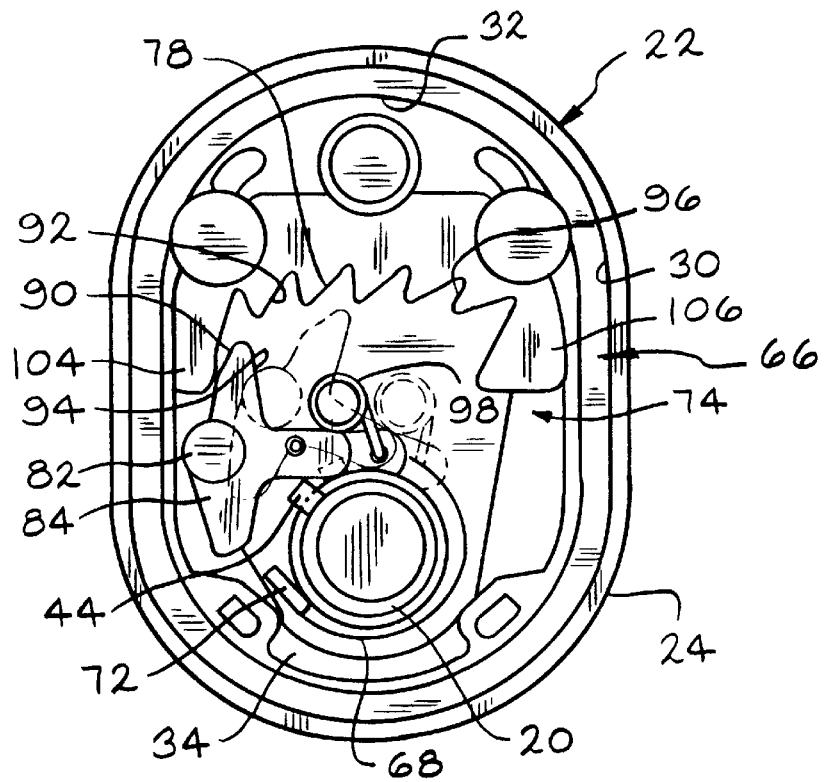
FIG. 5 is an end view of the first end of the headrest body and ratchet mechanism of FIG. 4 shown in a forward position.

Referring to FIGS. 3, 4 and 5, a ratchet mechanism 66 is disposed within the cavity 30 of the first side end 24 and operatively connected between the mounting post 20 and the headrest body 22 for providing forward ratcheting pivotal movement of the headrest body 22 relative to the mounting post 20 while locking the headrest body 22 against pivotal rearward movement. A biasing member 68 constantly urges the headrest body 22 toward the rearward pivotal movement. The biasing member 68 comprises a torsion spring supported on the mounting post 22 and having one end 70 engaging the inner surface of the cavity 30 of the headrest body 22 and an opposite end 72 engaging a portion of the mounting post 20.

The ratchet mechanism 66 includes a ratchet 74 pivotally coupled to the mounting post 20 and a rack 76 having a plurality of one-way directional rack teeth 78 fixedly secured to the headrest body 22 within the cavity 30. The ratchet 74 further comprises a support member 80 fixedly secured along the raised ridge 44 of the mounting post 20 and extending outwardly therefrom to a distal end having a pivot aperture 82 therein. A pawl 84 is pivotally coupled to the support member 80 for selectively engaging the rack teeth 78.

The pawl 84 is secured by a pivot pin through the pivot aperture 82 on the support member 80 and thus pivotal thereabout. The pawl 84 includes a projecting spring attachment tab 86 and a rack engaging portion 80 for operatively engaging the teeth 78 of the rack 76. The rack engaging portion 88 includes an inclined camming surface 90 facing forwardly of the headrest assembly 18 for cooperating with inclined camming surfaces 92 of the rack teeth 78. The camming surfaces 90 and 92 cooperate to enable the headrest body 22 to pivot forwardly as shown in FIGS. 4 and 5. The rack engaging portion 88 further includes a locking surface 94 facing rearwardly which cooperates with corresponding rearwardly facing locking surfaces 96 of the rack teeth 78 to prevent the headrest body 22 from pivoting rearwardly as also shown in FIGS. 4 and 5.

A spring member 98 has a first end 100 connected to the support member 80 and a second end 102 connected to the spring attachment portion 86 of the pawl 84 for normally biasing the pawl 84 toward operational engagement with the rack teeth 78.

As shown in FIGS. 4 and 5, the rack 76 is secured within the cavity 30 in the first side end 24 of the headrest body 22 and extends along an arcuate path in the upper portion 32 of the cavity 30. As indicated in FIG. 4, a starting position is established by the headrest body 22 being disposed in a rearward most position with a rack engaging portion 88 of the pawl 84 disposed immediately behind the first or rearward most tooth 78 of the rack 76. The headrest body 22 is tilted forwardly in a direction of the seat bottom 12 by bodily grasping the headrest body 22 and rotating the body 22 so that the pawl 84 ratchets between adjacent teeth 78 of the rack 76. The spring member 78 extends along one side, i.e. the rearward side, of the pivot 82 and biases the pawl 84 in a clockwise direction. The torsion spring 68 acts to maintain the locking surface 94 of the pawl 84 forced against the locking surface 96 of the associated tooth 78 to maintain the angularly adjusted position of the headrest body 22.

As indicated in FIG. 5, the headrest body 22 is returned to the starting position by tilting the headrest body 22 completely forwardly so that the camming surface 90 of the pawl 84 engages a forward projection 104 formed as a continuous extension of the last or forward most rack tooth 78. The forward projection 104 causes the pawl 84 to automatically rotate clockwise about the pivot 82 so that the line of force of the spring member 98 is over center of the pivot 82 (i.e., the spring 98 extends along the opposite side of the pivot 82), thereby causing the spring 98 to urge and maintain the pawl 84 in a knocked over inoperative position. In this position, the pawl 84 is completely disengaged from the rack 76 so that the headrest body 22 may be rotated rearwardly toward the starting position shown in FIG. 4 without the pawl 84 engaging the teeth 78. Upon reaching the rearward most tilted position, the tip of the pawl 84 engages the inside of the first tooth, or a rearward engaging projection 106, forcing the pawl 84 to rotate counterclockwise and further causing the spring 98 to rotate back over center of the pivot 82 to urge the pawl 84 into the upstanding operational position.

Figure 6:
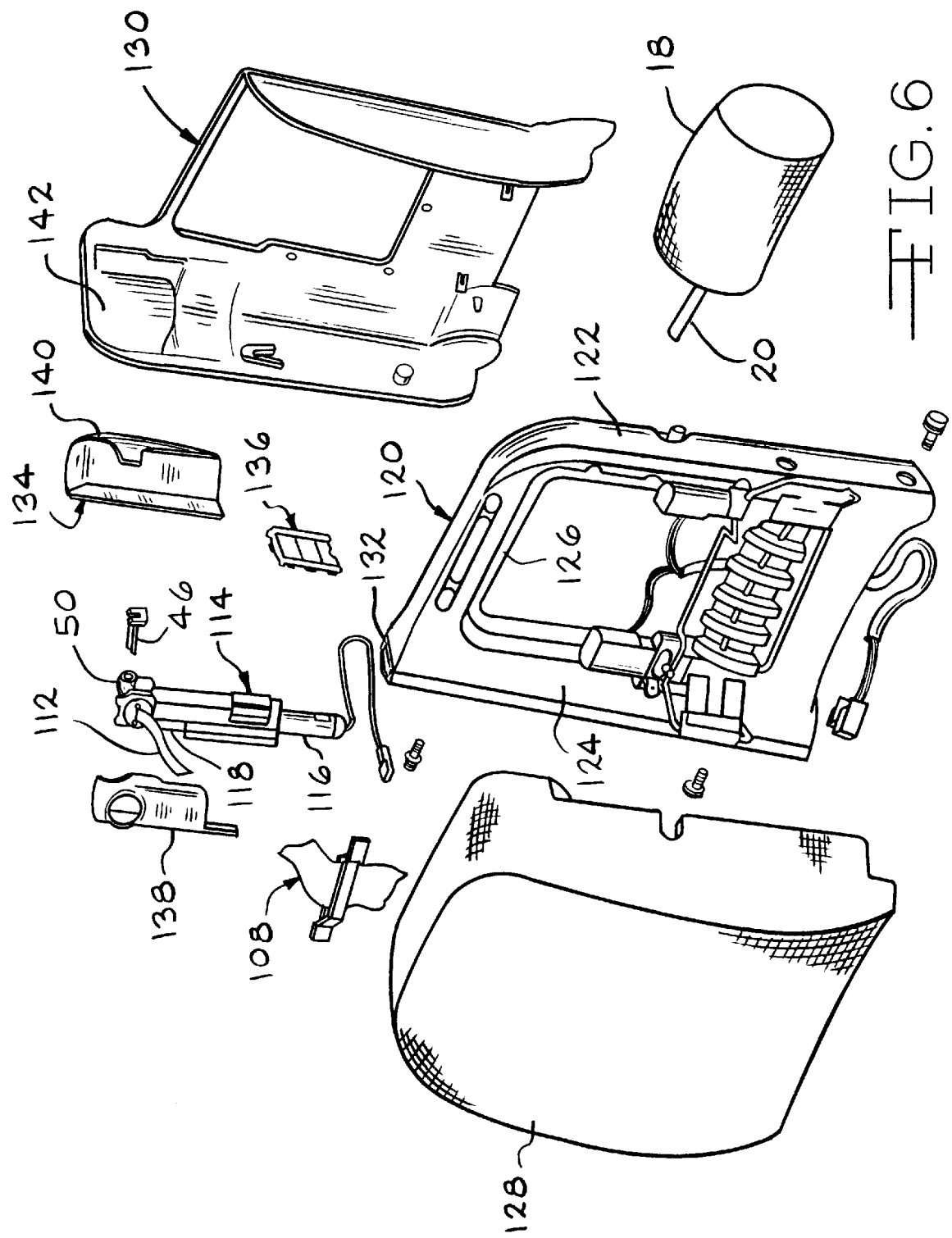
FIG. 6 is an exploded perspective view of a seat back detached from the seat assembly of FIGS. 1 and 2.

Referring to FIGS. 1, 2 and 6, a shoulder belt restraint 108 is operatively connected to the seat assembly 10 for restraining the occupant in the seat. The shoulder belt restraint 108 includes a waist belt 110 and a shoulder belt 112. The shoulder belt 112 extends from a retractor mounted in a telescoping tower 114. The telescoping tower 114 selectively adjusts the shoulder belt restraint 108 between a lower position immediately adjacent the seat back 14 and a raised position spaced vertically above the seat back 14. The upper portion of the tower 114 provides the support structure 50 for supporting the headrest assembly 18 as previously described. Thus, the telescoping tower 114 adjusts the position of both the shoulder belt 112 and the headrest assembly 18 between the lower and raised positions relative to the seat back 14.

Referring to FIG. 6, the telescoping tower 114 includes a lower portion 116 fixedly secured to the seat back 14 and an upper portion 118 movable relative to the lower portion 116 between the lower position and the raised position spaced vertically above the seat back 14. The seat back 14, as shown in FIG. 6, comprises a rigid seat back frame 120 having opposite first 122 and second 124 sides interconnected by an upper cross member 126. A contoured foam cushion and trim cover 128 overlays the seat back frame 120 and a rigid seat back trim panel 130 overlays the rear side of the seat back frame 120. One of the first 122 or second 124 sides of the seat back frame 120 includes a hollow reinforcing member 132 for receiving and supporting the lower portion 116 of the telescoping tower 114. A tower cover 134 is fixedly secured to at least a portion of the tower 114 and vertically movable therewith. The tower cover 134 includes an expandable window portion 136 coupled between the tower 114 and the seat back 14 for automatically expanding the coverage of the tower 114 upon movement of the tower 114 between the lower position and the raised position.

Figure 7:
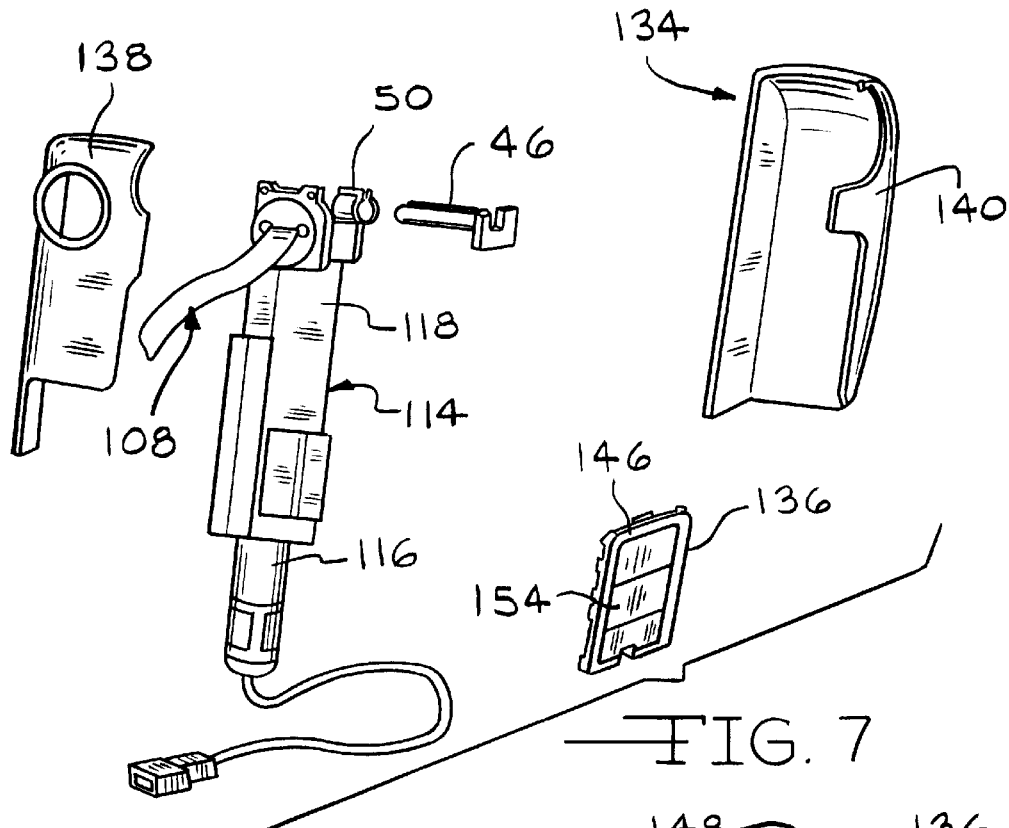
FIG. 7 is an enlarged perspective view of a telescoping tower and cover assembly removed from the seat back of FIG. 6.

More specifically, as shown in FIGS. 6 and 7, the tower cover 134 includes front 138 and rear 140 cover panels covering both the upper 118 and lower 116 tower portions and the window portion 136 slidably coupled between the front 138 and rear 140 cover panels for expanding coverage of the upper tower portion 118 upon movement relative to the lower tower portion 116 between the lower and raised positions.

The front cover panel 138 extends partially around and covers the telescoping tower 114 along a forward side adjacent the seat back cushion 128. Similarly, the rear cover panel 140 wraps partially around and covers a rear side of the telescoping tower 114 adjacent the seat back trim panel 130. The telescoping tower 114 and front 138 and rear 140 cover panels extend through an opening 142 in the seat back trim panel 130 to move vertically through the opening 142 relative to the seat back 14 between the lowered and raised positions. A gap 144 or space (see FIG. 2) extends between the front 138 and rear 140 cover panels adjacent the first side 122 of the seat back frame 130 which exposes the upper portion 118 of the tower 114 in the raised position. Therefore, the window portion 136 is coupled between the front 138 and rear 140 cover panels for extending coverage of the upper tower portion 118 upon movement of the tower 114 between the lowered and raised positions.

Figure 8:
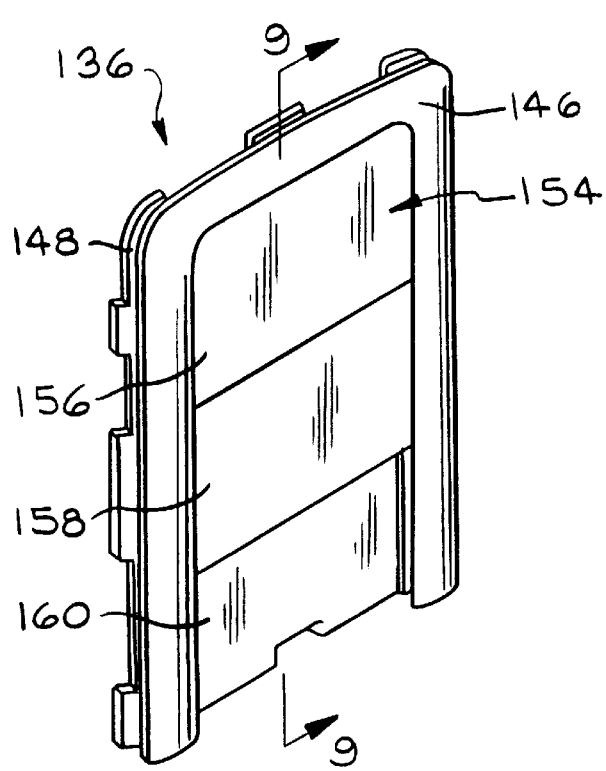
FIG. 8 is an enlarged perspective view of a adjustable window cover removed from the tower and cover assembly of FIG. 7.
Figure 9:
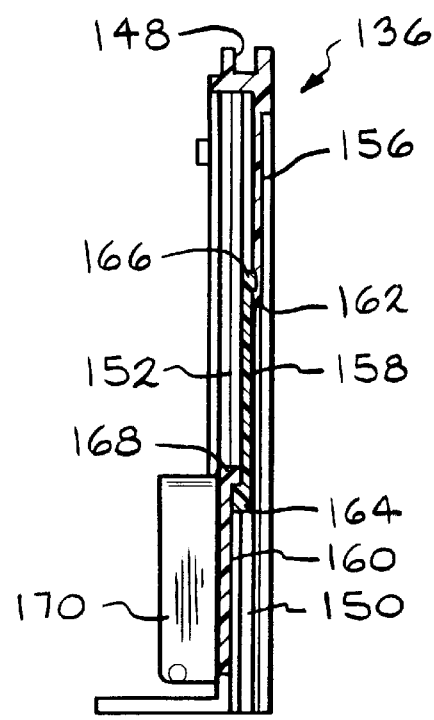
FIG. 9 is a sectional view taken through line 9—9 of FIG. 8.

As shown in FIGS. 7 through 9, the window portion 136 comprises a generally U-shaped outer rim 146 having an outer channel 148 and a pair of spaced apart parallel inner channels or tracks 150 and 152. The outer channel 148 receives the edge portion of the opposing front 138 and rear 140 cover panels for securing the window portion 136 therebetween. The inner channels or tracks comprise first 150 and second 152 parallel tracks and slidably receive a plurality of overlapping sliding panes 154 for extending coverage of the upper tower portion 118 by expanding and contracting in overlapping relationship upon movement of the tower 114 between the lowered and raised positions. Specifically, each of the panes 154 slide independently within the inner channels 150 and 152 of the outer rim 146 to expand and contract the coverage in overlapping relationship of the window portion 136 over the upper tower portion 118.

The preferred embodiment of FIG. 9 includes three overlapping window panes 154, an upper pane 156, a middle pane 158 and a lower pane 160. The upper pane 154 is fixedly secured to the outer rim 146 and includes a lower locking tab 162 for engaging the middle pane 158. The middle pane 158 is slidable within the first inner channel 150 independent of both the upper 156 and lower 160 panes and includes a lower locking tab 164 for engaging the lower pane 160 and an upper locking tab 166 for engagement with the lower locking tab 162 of the upper pane 156 for limiting movement of the middle pane 158 along the first track 150. The lower pane 160 is slidable within the second track 152 independent of both the upper 156 and middle 158 panes and includes an upper locking tab 168 for engaging the lower locking tab 164 of the middle pane 153 for limiting movement of the lower pane 160 along the second track 152. The lower pane 160 further includes a outwardly extending connector 170 which is connected to the seat back frame 120 such that when the upper portion 118 of the tower 114 is extended to the raised position, the sliding panes 154 are expanded in sliding relationship along the tracks 150 and 152 of the outer rim 146 to extend the window portion 136 coverage over the upper tower portion 118 upon movement to the raised position. The lower pane 160 slides first along the second track 152 until the locking tab 168 engages the lower locking tab 164 of the middle pane 158. The lower pane 160 continues to slide along the second track 152 and the middle pane 158 slides along the first track 150 until the upper locking tab 166 engages the lower locking tab 162 of the upper pane 156 with the tower 114 in the raised position.

As the telescoping tower 114 is adjusted to the lower position, the sliding panes 154 engage the top of the seat back frame 120 and contract in overlapping relationship to allow the tower 114 and front 138 and rear 140 cover panels to extend through the opening 142 in the seat back trim panel 130 and lower the headrest assembly 18 and shoulder restraint 108 to the lower position adjacent the seat back 14. In other words, the lower 160 and middle 158 panes engage the seat back 14 as the tower 114 is moved to the lower position and thus slide upwardly along the respective tracks 150 and 152 with the middle pane 158 overlapping behind the upper pane 156 and the lower pane 160 overlapping behind the upper 156 and middle 158 panes. In the raised position, the locking tabs between each of the upper 156, middle 158 and lower 160 panes engage to prevent separation of the panes and eliminate the possibility of a space or gap therebetween. It will be appreciated that any number of window panes 154 and respective tracks 150 and 152 may be provided in the window cover portion 136 to accommodate varying height or distance travel of the tower 114 from the lower to the raised position spaced above the seat back 14.

Alternatively, the window portion 136 may include a flexible sheet having a first end connected to the seat back panel 130 between the front 138 and rear 140 panels and a second end connected to the seat back 14 for vertically expanding and contracting in an accordion type fashion along a track between the front and rear panels upon movement of the tower 114 between the lower and raised position to extend coverage of the upper tower portion.

In accordance with the provisions of the patent statutes, the principle and mode of operation of this invention has been explained and illustrated in its preferred embodiments. However, it must be understood that this invention may be practiced otherwise than as specifically explained and illustrated without departing from its spirit or scope.

What is claimed is:

1. A vehicular seat assembly comprising:

a seat bottom defining an occupant sitting area;

a seat back defining an occupant back support, the seat back coupled to the seat bottom and including opposing first and second sides interconnected by an upper cross member;

a shoulder belt restraint operatively connected to the seat back for restraining an occupant in the seat assembly;

a telescoping tower mounted on the seat back, the tower including a lower portion fixedly secured to one of the seat back sides and an upper portion movable relative to the lower portion to selectively adjust the shoulder belt restraint between a lower position immediately adjacent the seat back and a raised position spaced vertically from the seat back; and a tower cover fixedly secured to the upper portion of the tower and vertically movable therewith, the tower cover including front and rear cover panels covering the upper tower portion and an expandable window portion coupled to the front and rear cover panels for automatically expanding coverage of the upper tower portion upon movement of the tower between the lower position and the raised position.

2. The vehicular seat assembly specified in claim 1 wherein the window portion includes a flexible sheet having a first end connected to the cover between the front and rear panels and a second end connected to the seat back for vertically expanding and contracting between the front and rear panels upon movement of the tower between the lower and raised positions.

3. The vehicular seat assembly specified in claim 1 wherein the window portion includes a plurality of overlapping sliding panes slidably coupled between the front and rear panels for extending coverage of the upper tower portion by expanding and contracting in overlapping relation upon movement of the tower between the lower and raised positions.

4. The vehicular seat assembly specified in claim 1 including a headrest assembly connected to the tower and movable therewith.

5. The vehicular seat assembly specified in claim 1 wherein the window portion includes an outer rim having inner channels receiving slidable panes.

6. The vehicular seat assembly specified in claims wherein at least an upper pane, a middle pane, and a lower pane are received in the inner channels.

7. The vehicular seat assembly specified in claim 6 wherein the upper pane is fixedly secured to the outer rim and includes a locking tab for engaging the middle pane.

8. The vehicular seat assembly specified in claim 7 wherein the middle pane includes a lower locking tab for engaging the lower pane.

9. The vehicular seat assembly specified in claim 7 wherein the lower pane includes a connector connected to the seat back.

10. A vehicular seat assembly comprising:

a seat bottom;

a seat back coupled to the seat bottom;

a telescoping tower mounted on the seat back;

a shoulder belt mounted on the tower, and a tower cover secured to the tower and movable therewith, the tower cover including an expandable window portion for automatically expanding coverage of the tower upon movement of the tower cover, the window portion including a plurality of panes slidably mounted on the tower cover such that said panes are slidable relative to each other, wherein one pane of the plurality of panes is a lower pane connected to the seat back.

11. The vehicular seat assembly specified in claim 10 including a connector provided on the lower pane, wherein the connector is connected to the seat back.

12. The vehicular seat assembly specified in claim 10 wherein the window portion includes an outer rim having a plurality of tracks.

13. The vehicular seat assembly specified in claim 12 wherein the lower pane is slidably received in a first track of the rim and a middle pane is slidably received in a second track of the rim.

14. A vehicular seat assembly comprising:

a seat bottom;

a seat back coupled to the seat bottom;

a telescoping tower mounted on the seat back;

a shoulder belt mounted on the tower, and a tower cover secured to the tower and movable therewith, the tower cover including an expandable window portion for automatically expanding coverage of the tower upon movement of the tower cover, the window portion including a rim having an upper pane fixed to the rim, a middle pane slidably received in a first track of the rim, and a lower pane slidably received in a second track of the rim.

15. The vehicular seat assembly specified in claim 14 wherein the lower pane is connected to the seat back.

16. The vehicular seat assembly specified in claim 14 wherein each pane includes a locking tab.

* * * * *